United States Patent
Gunjan

(10) Patent No.: US 9,449,287 B2
(45) Date of Patent: Sep. 20, 2016

(54) SYSTEM AND METHOD FOR PREDICTING PERSONALITY TRAITS USING DISC PROFILING AND BIG FIVE PERSONALITY TECHNIQUES

(71) Applicant: Wipro Limited, Bangalore (IN)

(72) Inventor: Abhishek Gunjan, Gaya (IN)

(73) Assignee: Wipro Limited, Bangalore (IN)

( * ) Notice: Subject to any disclaimer, the term of this patent is extended or adjusted under 35 U.S.C. 154(b) by 358 days.

(21) Appl. No.: 14/300,860

(22) Filed: Jun. 10, 2014

(65) Prior Publication Data
US 2015/0310344 A1    Oct. 29, 2015

(30) Foreign Application Priority Data
Apr. 29, 2014   (IN) ............ 2151/CHE/2014

(51) Int. Cl.
*G06N 3/08*     (2006.01)
*G06N 99/00*    (2010.01)
*G06Q 10/06*    (2012.01)
*G06Q 50/00*    (2012.01)

(52) U.S. Cl.
CPC ........ *G06N 99/005* (2013.01); *G06Q 10/0639* (2013.01); *G06Q 50/01* (2013.01); *G06N 3/08* (2013.01)

(58) Field of Classification Search
None
See application file for complete search history.

(56) References Cited

PUBLICATIONS

Golbeck, et al., Predicting Personality with Social Media, Proceeding CHI '11 Extended Abstracts on Human Factors in Computing Systems, 2011, pp. 253-262.*

* cited by examiner

*Primary Examiner* — Wilbert L Starks
(74) *Attorney, Agent, or Firm* — LeClairRyan, a Professional Corporation

(57) ABSTRACT

The present disclosure relates to systems, methods, and non-transitory computer-readable media for human personality prediction by analyzing information collected from different sources such as social media, call detail record (CDR), email etc. using DISC (dominance, inducement, submission, and compliance) profiling and Big Five personality techniques (openness, conscientiousness, extraversion, agreeableness, and neuroticism). Embodiments in accordance with the present disclosure are further capable of using a self-learning model which learns from user response to the prediction.

20 Claims, 5 Drawing Sheets

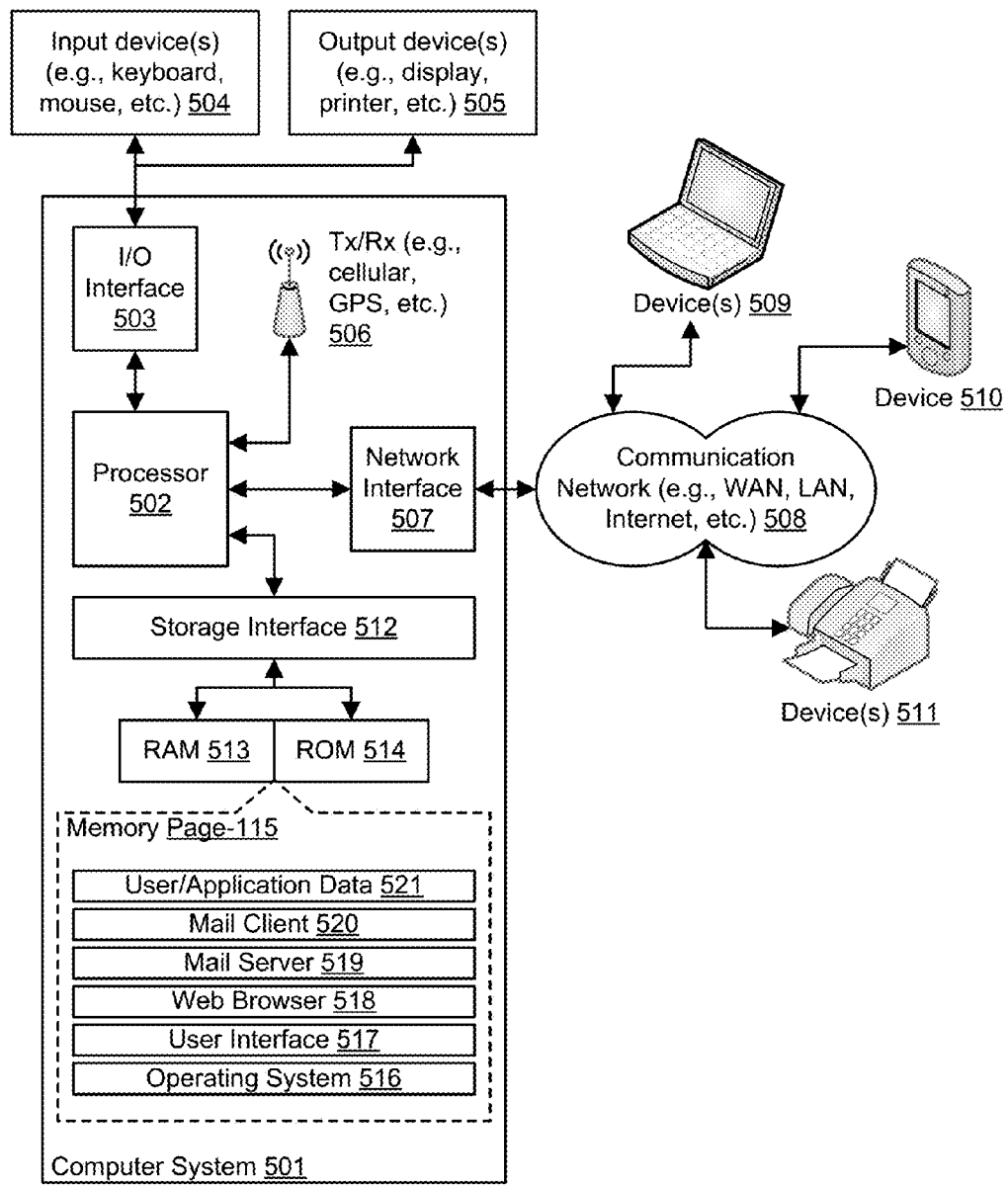
FIG. 5: Example Computer System

SYSTEM AND METHOD FOR PREDICTING PERSONALITY TRAITS USING DISC PROFILING AND BIG FIVE PERSONALITY TECHNIQUES

CROSS-REFERENCE TO RELATED APPLICATIONS

This application claims the benefit of Indian Patent Application Filing Number 2151/CHE/2014, filed on Apr. 29, 2014, which is hereby incorporated by reference in its entirety.

FIELD

The present disclosure relates generally to predicting human personality, and more particularly to system and method for predicting human personality using disc profiling and big five personality techniques.

BACKGROUND

Existing systems for personality trait prediction from text does the prediction separately for different sources of data like social media, call detail records, email. There are systems available that discloses multiple ways of performing personality prediction from text. The detection of different personality from text has been used widely across multiple fields, for example, one of the main areas, hiring process wherein personality prediction from text is currently used for determining Whether a personality is suitable for testing job, research manager, etc. . . . ?

Whether he/she a good team player?

Personality prediction also helps to understand state of personality namely confused, organized, abstract or definitive. There are different techniques for predicting the personality from text. A person may typically have more than one personality trait but current systems are not able to identify which is the most prominent and less significant trait from the multiple personality traits identified.

The limitation of the current systems is how to correlate the information on the multiple personality traits that have been identified from the text from different sources of data. This limitation stems from the fact that the current systems do not go into deep levels like analysis of texts based on different topics and correlating them based on the prominent personality traits. Further, current systems do not know how to automate the above process in an efficient manner according to need and for benefit of different businesses.

Therefore, it would be desirable to have a system and a method for predicting the personality of the person by correlating the information obtained from different sources of data. Further, it would be desirable to have a mechanism for learning from user response to the predicted personality

SUMMARY

Disclosed herein is a method for predicting a personality of at least one human subject. The method includes receiving data associated with the at least one human subject from one or more sources; clustering the data based on one or more topics of interest of the at least one human subject using one or more topic modeling algorithms; predicting at least one high level personality trait associated with the at least one human subject by analyzing the clustered data, the at least one high level personality trait being one of one or more high level personality traits defined by a first model; and predicting at least one personality profile by classifying the at least one high level personality trait into one or more granular level personality traits defined by a second model, the classifying being based on clustered data, wherein at least one of the receiving data, the clustering the data, the predicting at least one first personality, and the predicting at least one second personality is performed by a processor.

In an aspect of the present disclosure, a system for predicting for predicting a personality of at least one human subject includes one or more hardware processors; and a computer-readable medium storing instructions that, when executed by the one or more hardware processors, cause the one or more hardware processors to perform operations comprising: receiving data associated with the at least one human subject from one or more sources; clustering the data based on one or more topics of interest of the at least one human subject using one or more topic modeling algorithms; predicting at least one high level personality trait associated with the at least one human subject by analyzing the clustered data, the at least one high level personality trait being one of the one or more high level personality traits defined by a first model; and predicting at least one personality profile by classifying the at least one high level personality trait into one or more granular level personality traits defined by a second model, the classifying being based on clustered data.

In another aspect of the invention, a non-transitory computer-readable medium storing instructions for predicting a personality of at least one human subject that, when executed by a processor, cause the processor to perform operations comprising: receiving data associated with the at least one human subject from one or more sources; clustering the data based on one or more topics of interest of the at least one human subject using one or more topic modeling algorithms; predicting at least one high level personality trait associated with the at least one human subject by analyzing the clustered data, the at least one high level personality trait being one of the one or more high level personality traits defined by a first model; and predicting at least one personality profile by classifying the at least one high level personality trait into one or more granular level personality traits defined by a second model, the classifying being based on clustered data.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

BRIEF DESCRIPTION OF THE DRAWINGS

The accompanying drawings, which constitute a part of this specification, illustrate several embodiments and, together with the description, serve to explain the disclosed principles. In the drawings:

FIG. 5 is a block diagram of an exemplary computer system for implementing embodiments consistent with the present disclosure.

DETAILED DESCRIPTION

As used herein, reference to an element by the indefinite article "a" or "an" does not exclude the possibility that more than one of the element is present, unless the contextually requires that there is one and only one of the elements. The indefinite article "a" or "an" thus usually means "at least one." The disclosure of numerical ranges should be understood as referring to each discrete point within the range, inclusive of endpoints, unless otherwise noted.

As used herein, the terms "comprise," "comprises," "comprising," "includes," "including," "has," "having," "contains," or "containing," or any other variation thereof, are intended to cover a non-exclusive inclusion. For example, a composition, process, method, article, system, apparatus, etc. that comprises a list of elements is not necessarily limited to only those elements but may include other elements not expressly listed. The terms "consist of," "consists of," "consisting of," or any other variation thereof, excludes any element, step, or ingredient, etc., not specified. The term "consist essentially of," "consists essentially of," "consisting essentially of," or any other variation thereof, permits the inclusion of elements, steps, or ingredients, etc., not listed to the extent they do not materially affect the basic and novel characteristic(s) of the claimed subject matter.

Figure 1:
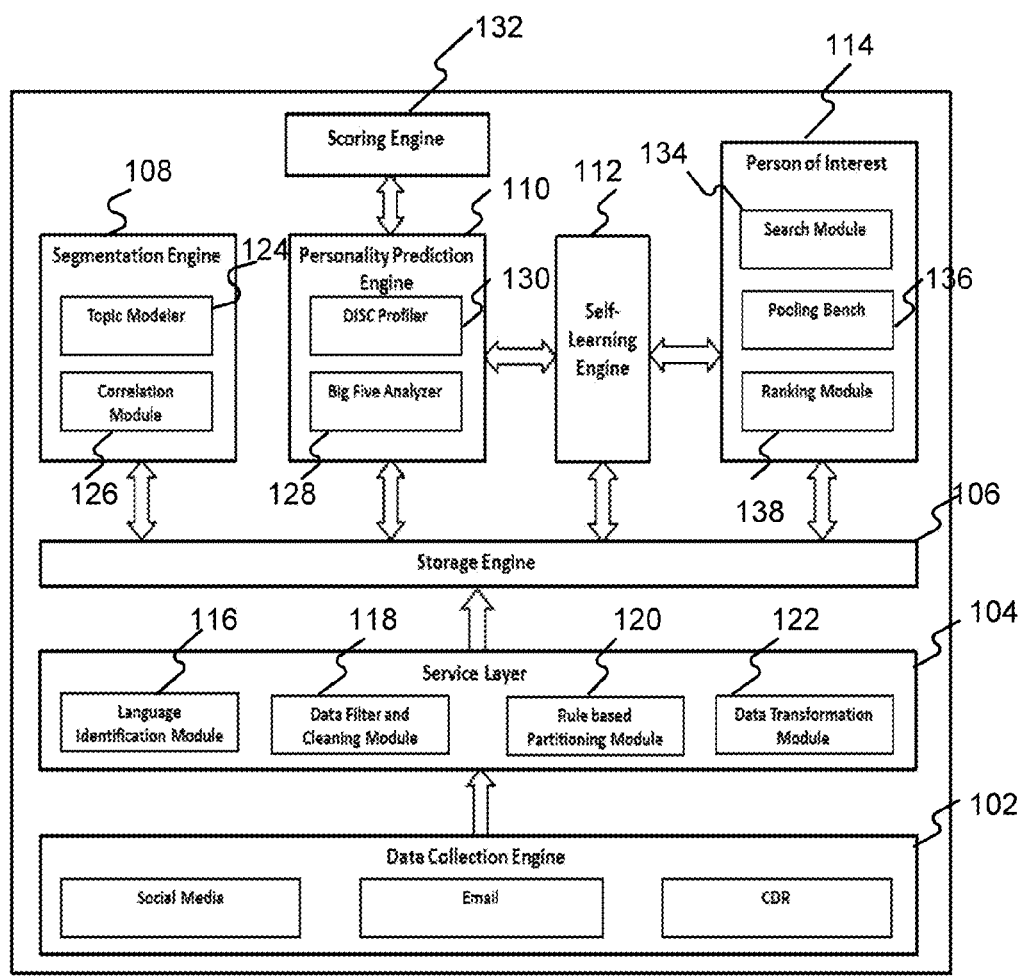
FIG. 1 is a block diagram of a high-level architecture of an exemplary system for predicting a personality of a human subject in accordance with the present disclosure.

FIG. 1 is a block diagram of a high-level architecture of an exemplary system 100 for predicting the personality of a human subject in accordance with the present disclosure comprising a data collection engine 102, a service layer 104, a storage engine 106, a segmentation engine 108, a personality prediction engine 110, a self-learning engine 112, and a person of interest engine 114. The data collection engine 102 collects data from external and internal sources. After collecting the data, the data collection engine 102 sends the data to the service layer 104. The service layer 104 further comprises a language identification module 116, a data filter and cleaning module 118, a rule based partitioning module 120, and a data transformation module 122 that processes the collected data. The processed data then goes to the storage engine 106. The processed data is accessed and it goes through further levels of segmentation and correlation by the segmentation engine 108. The segmentation engine 108 comprises a topic modeler 124 and a correlation module 126. After the segmentation of the data, the data is sent to the personality prediction engine 110 where personality prediction is made by a big five analyzer model 128 and a DISC profiler model 130. Then a scoring engine 132 gives score for a personality trait to a given topic. The person of interest module 114 performs people search based on personality traits, demographic distribution, gender and topic of interest related to a human subject. The person of interest module 114 comprises a search module 134, a pooling bench 136, and a ranking module 138.

The architecture shown in FIG. 1 may be implemented using one or more hardware processors (not shown), and a computer-readable medium storing instructions (not shown) configuring the one or more hardware processors; the one or more hardware processors and the computer-readable medium may also form part of the system 100.

Figure 2:
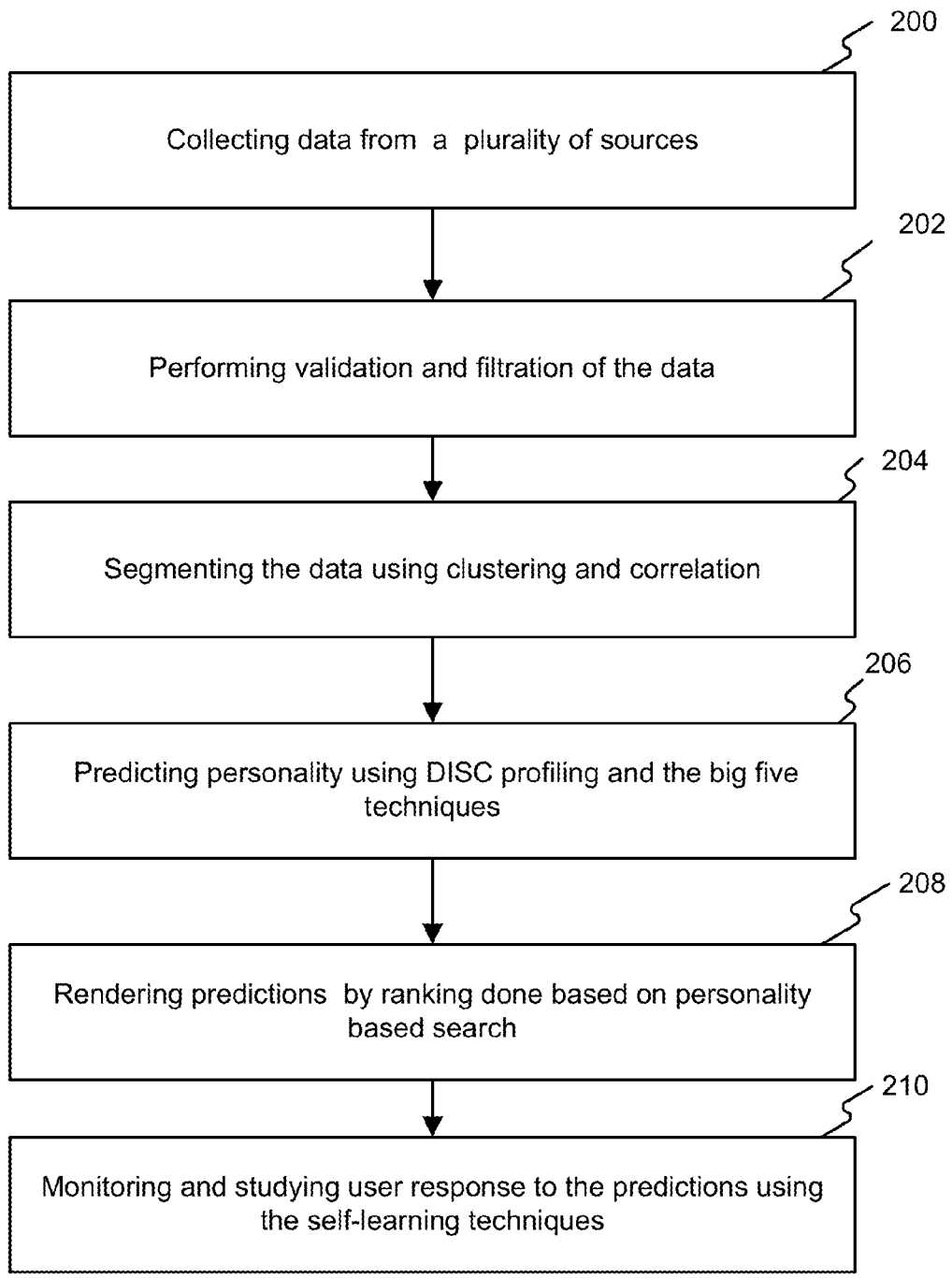
FIG. 2 is a flowchart of an exemplary method for predicting a personality of a human subject in accordance with certain embodiments of the present disclosure.

FIG. 2 is a flowchart of an exemplary method for identifying a personality of a human subject in accordance with certain embodiments of the present disclosure that may be executed by the system 100 as described in further detail below. It is noted however, the functions and/or steps of FIG. 2 as implemented by system 100 may be provided by different architectures and/or implementations without departing from the scope of the present disclosure.

Referring to FIG. 2, at step 200, the data collection engine 102 may collect data from a plurality of sources. The plurality of sources may be external sources and internal sources. External sources may include social media and mobile data stores like Twitter, Facebook, blogs, forums, whatsApp etc. Call details records (CDR) may be another external source of data. In some embodiments, a new source may be added from a configuration file, for example, a new template can be added for social media listener. Internal sources may include gathering data from chat and emails.

Figure 3:
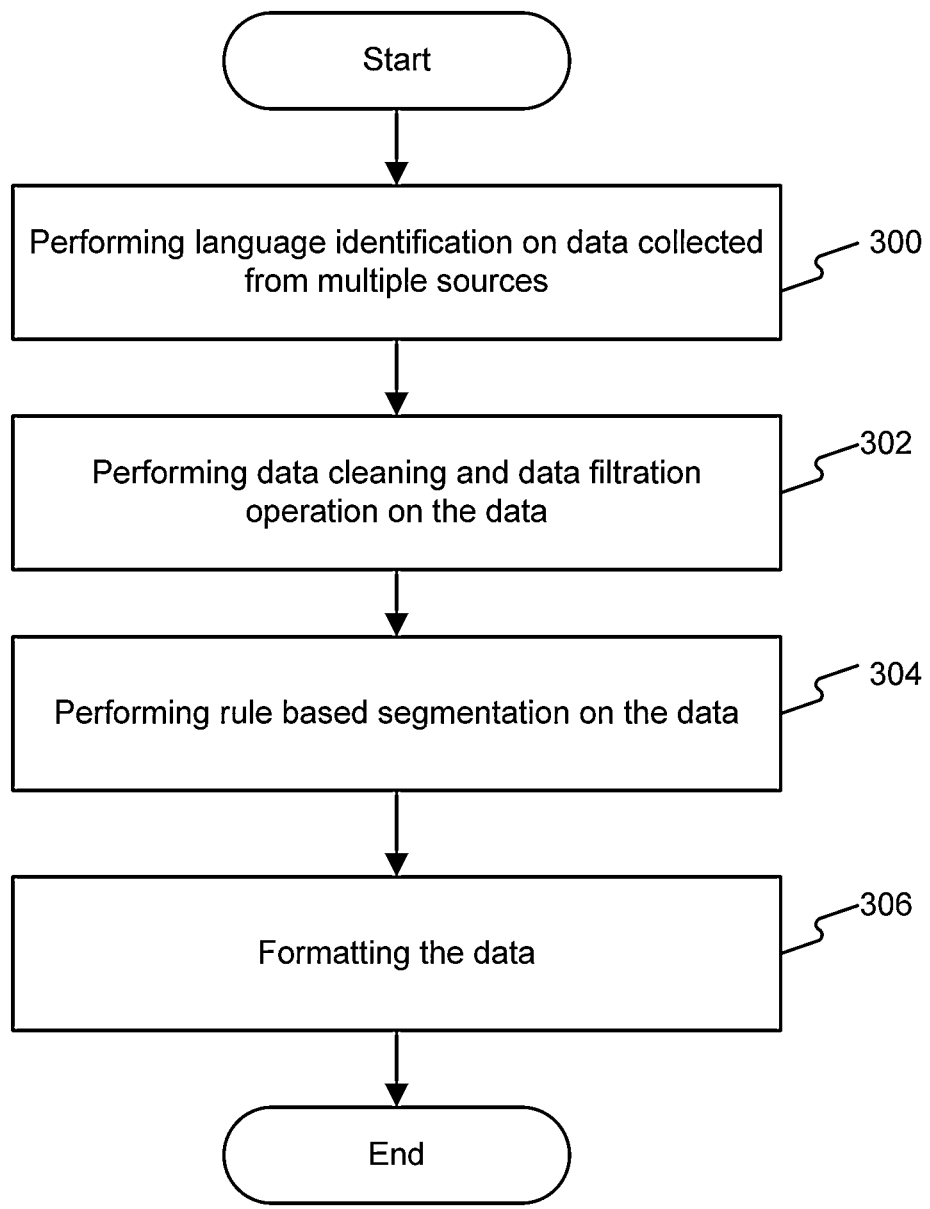
FIG. 3 illustrates an exemplary method of the validation and filtration of data in accordance with certain embodiments of the present disclosure.

Once the data may be collected by the data collection engine 102, the data may go to the service layer 104 that performs validation and filtration of the data (step 202). The validation and filtration of data has been illustrated by way of flowchart in FIG. 3. FIG. 3 illustrates an exemplary method of the validation and filtration of data in accordance with certain embodiments of the present disclosure. At step 300, language identification may be performed by the language identification module 116 by using some open source libraries designed for language identification. There are numerous such libraries and some of them are specialized for latin origin languages, some are for Indian languages and pictorial based languages.

At step 302, data cleaning and data filtration operation may be performed on the data by the data filter and cleaning module 118. The process of data cleaning may be a template based cleaning process as there are certain variation in data representation and format. For example; @ symbol has a different meaning in tweet as compared to @ symbol in email. Because of this; there may be a great need to have different type of filtration template. Also in terms of personality detection, use of certain characters has different meaning and represent different characteristic of any personality. Also in case of tweet, @ and # has got special meaning where as it may not necessarily true for blog and new sites. Based on the source of data, special characters from the text may be removed. So we will have customized filter based on the source of data. The process of data filtration may be done by using machine learning based classifier which is trained based on how we define business and non-business data. For example; if this engine may be used to know whether a user is an influential personality of a particular brand; then all the data which doesn't belong to that brand and competitor brand may be removed in analysis.

At step 304, the data may undergo through rule based segmentation. There may be a great impact of demography, culture/society and gender to some extent in building the personality of a person. For gender detection, if the source of data is email then gender detection may be straight forward as the email server contains user profile with full name, address, gender, etc. but for the cases when it is not known, a gender detection dictionary/algorithm based on name may be used.

At step 306, all the preprocessed data may be made ready in the format (either document/column based) to be loaded into the storage engine 106 which acts as data store with additional detected information in this step (like demography, gender, etc. . . . ). The storage engine 106 may work as the repository store of all the collected and processed data both at intermediate and final state.

For optimization and faster access, the storage engine 106 may be designed as a hybrid store of both SQL and No-SQL based databases. SQL may work as meta store of data for faster access and No-SQL may work as document store of all the collected and processed data.

At step 204, the data stored in the storage engine 106 may be accessed and may go through segmentation comprising clustering and then correlation. It may be found out what all are the topic on which the processed data may be talking about. It may comprise of an advanced feature of configuring profiles and demographics, and building multiple hierarchical clusters of similar topics. For example, there may be clusters based on i-pad, i-phone. Clustering of the processed data may be performed by the topic modeler 124.

Every human may pose different types of personality based on his/her knowledge in particular section/area. A person who is more into say automobile may understand it better and might poses a character of being more careful in terms of car servicing, which is a sign of "Conscientiousness" characteristics as per Big Five model. There could also be a case where a person talks a lot about cars and is in day in and out into it, but is not very careful about it, which gives the degree of conscientiousness characteristics. Thus, there is a great need to know the characteristics possessed by an individual in a particular category. A person with less degree of conscientiousness in automobile is more likely take less care of his/her car and might run into too many insurance claims. It also helps to know whether an individual is Influential among community about car which opens new door for automobile providers to make him/her as the brand ambassador on say twitter and expand business. The Topic Modeler 124 internally uses topic modeling algorithms and build clusters around multiple topics of interest of an individual.

Thereafter the correlation engine 126 may find relationship between multiple people based on topic of interest, physiographic distribution, gender difference and demographic distribution. This correlation engine 126 may create a collaborative filter matrix of all the people whose interest are of similar kind, lives in same region, share the same gender and have the same personality traits. The collaborative filter matrix may be stored in the storage engine 106. The correlation engine 126 may help the person of interest module 114 to search similar kind of people better. So let us say we are looking for a person who is influential in nature and lives in say West Coast and is male, then this system will quickly refer to the collaborative filter matrix been built by the correlation engine 126 and will pass on the result of person of interest module 114. This may optimize the search.

Figure 4:
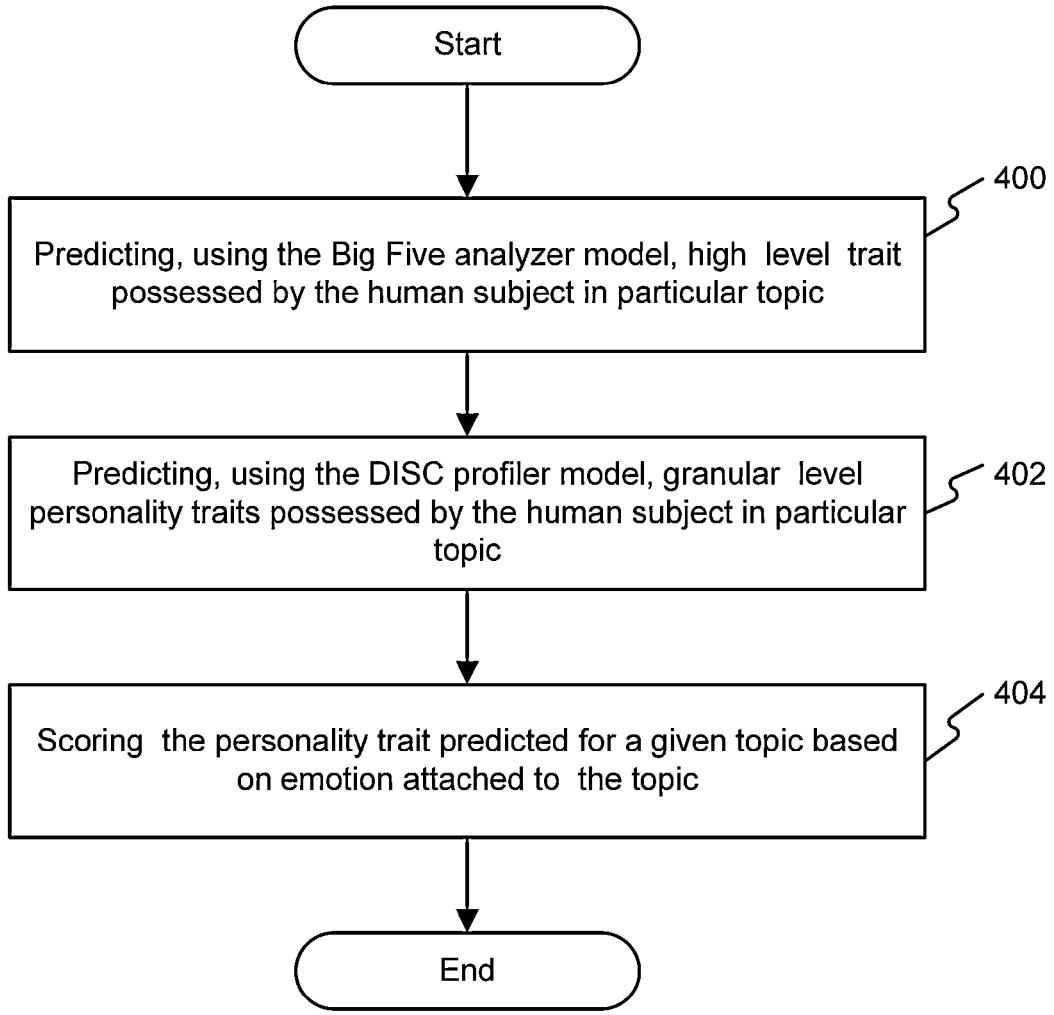
FIG. 4 illustrates an exemplary method of the personality prediction using DISC profiling and the big five techniques in accordance with certain embodiments of the present disclosure.

At step 206, personality prediction may be performed. The personality prediction has been illustrated by way of flowchart in FIG. 4. FIG. 4 illustrates an exemplary method of the personality prediction using DISC profiling and the big five techniques in accordance with certain embodiments of the present disclosure. The personality prediction may be done without having any question and answer kind of session with the user. The personality prediction engine 110 may generate knowledge like what is the personality trait of human subject in different section of topic. It is highly possible that a human subject possess steadiness in personality in some topic, but could be dominating in some other section. The friend circle analysis is also done in this section to know more about the person and also the profiling of friends is done to know what kind of circle he/she is in. This will help to fill in hidden gaps while predicting personality traits.

Big Five Analyzer model 128—At step 400, the text posted by the human subject in particular topic is analyzed using the Big Five factors (Openness, Conscientiousness, Extraversion, Agreeableness, and Neuroticism). This model is used to find out the high level trait possessed by the human subject by analyzing the text posted on a topic. This model 128 is used to find out whether:

The person is open to new experience/solutions. While building up personality traits, it will be checked whether the topic extracted is about some new products or not. If it is relatively new product and then the users are trying to explore new features into it, then it is considered as sign of a quality of been open to new experience.

The person is conscientious about the certain topic.

The person is also very excited about certain topic and loves to talk a lot about it.

The person agrees to other people's view or only tries to put his/her ideas on top of others.

The person is very sensitive to certain things and expresses his/her emotion in some form.

DISC Profiler model 130—At step 402, in the DISC Profiler model 130, the DISC (Dominance, Inducement, Submission, and Compliance) traits are used for analyzing the data. This model 130 is used to find out the granular level personality traits possessed by the human subject. From the text posted by the user on a particular topic across different social media, mobile apps, CDR and emails, there are always certain patterns possessed by person based on whatever quadrant of DISC he/she belongs to. For example, the person with Dominance characteristics will always try to talk about oneself with addition pattern stating that he/she is not satisfied by the people around him/her. So from the text the Profiler module will extract information on how many times the user talks about oneself and how frequently he/she points out problems as compared to talking good things about it. This may be used to decide whether a person is of D characteristics then what is the percentage of it. Similarly; the person with Compliance characteristics will tend to find out small-small things out of the information. She/he may deep dive in a particular topic and will basically point out problems. The DISC profiler module 130 may be the rules that will be used for identifying the traits possessed by different kind of personality. The rules would be run on the user data information to build DISC personality profile by this model.

At step 404, the scoring engine 132 gives scores for the personality trait to a given topic. A person might be highly attached to certain topic whereas least bothered about some of the other things. Based on the total data set talking about personality trait on a particular topic, the scoring engine 132 may use certain/specific emotion attached to it and then gives score to the personality trait. The emotion detection may be done by using a technique of how frequently the person talks about a certain topic and what is the sentiment associated to it. The sentiment detection may be done using contextual based linguistic algorithms. For e.g. if the person possess a quality of openness to experience to certain topic as per big five analyzer model 128, then it is determined to what percentage he/she is open to experience new things. Every person has some percentage of personality traits from all different dimensions/quadrants of DISC profiler model 130. This scoring engine 132 may build the scoring of the personality trait like, if a person is dominating in nature then what is the percentage of that quality and so on.

Referring to FIG. 2, at step 208, predictions are rendered by ranking done based on multi-correlation approach. User performs an advance personality based search using the search module 134 in the Person of Interest module 114. The search is performed based on linguistic based search which is done on the personality traits and score identified in Step 206 and available in the storage engine 106. The user can also do the search for the right kind of personality in an organized way using the configurations details provided in the pooling bench 136. After the search is performed by the searching module 134 and it is provided to the ranking module 138 before rendering the search results to the user. The ranking module 138 does the ordering of the search results by using a personality trait based ranking algorithm and also determines confidence level by marking some of the result with in the scale of 1-5 distinguished by color codes like green, yellow, red etc.

At step 210, user response to prediction is monitored and studied using the self-learning techniques. When the user does a search using the person of interest module 114, the self-learning engine 112 learns from the user response to the search result. The self-learning engine 112 monitors and studies the pattern in which the user accesses the search results. That is the self-learning engine 112 learns from the user 'clicks' on search page and stores the feedback as for what all topics, profiles, demography and gender the system is not giving the optimum result. The self-learning Engine 112 then normalizes the score associated with the personality trait to optimize the predictions based on the user response. After this the normalized score is stored back to the Storage Engine.

Exemplary Computer System

FIG. 5 is a block diagram of an exemplary computer system for implementing embodiments consistent with the present disclosure. Variations of computer system 501 may be used for implementing any of the devices and/or device components presented in this disclosure, including system 101. Computer system 501 may comprise a central processing unit (CPU or processor) 502. Processor 502 may comprise at least one data processor for executing program components for executing user- or system-generated requests. A user may include a person using a device such as such as those included in this disclosure or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750 IUB8, Infineon Technologies X-Gold 518-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for predicting a personality of at least one human subject, the method comprising:
    receiving data associated with the at least one human subject from one or more sources;
    clustering the data based on one or more topics of interest of the at least one human subject using one or more topic modeling algorithms;
    predicting at least one high level personality trait associated with the at least one human subject by analyzing the clustered data, the at least one high level personality trait being one of one or more high level personality traits defined by a first model; and
    predicting at least one personality profile by classifying the at least one high level personality trait into one or more granular level personality traits defined by a second model, the classifying being based on clustered data,
    wherein at least one of the receiving data, the clustering the data, the predicting at least one first personality, and the predicting at least one second personality is performed by a processor.

2. The method of claim 1, further comprising assigning a score to each of the one or more granular level personality traits based on emotion attached to the at least one topic of interest.

3. The method of claim 2, wherein the emotion attached to the at least one topic of interest is determined based on frequency of talking about the at least one topic of interest by the at least one human subject across the one or more sources.

4. The method of claim 1, further comprising performing a people search based on the at least one high level personality trait, the at least one personality profile, demographic distribution, gender, and the at least one topic of interest.

5. The method of claim 4, further comprising determining a confidence level for result associated with the people search, the confidence level indicative of the accuracy of the result.

6. The method of claim 1, further comprising generating a multi-dimensional hierarchical correlation matrix of one or more human subjects of the at least one human subject based on at least one of the one or more topics of interest, gender, and demography.

7. The method of claim 1, wherein receiving the data associated with the at least one human subject from the one or more sources comprises:
retrieving the data from the one or more sources;
performing language identification on the data;
cleaning and filtering the data by removing unwanted characters and notation;
partitioning the data based on demography, culture, and gender; and
transforming the data to at least one format.

8. The method of claim 1, further comprising monitoring response of a user to the predicted at least one high level personality trait and the predicted at least one personality profile using self-learning techniques.

9. The method of claim 1, wherein the first model is DISC (dominance, inducement, submission, and compliance) model.

10. The method of claim 1, wherein the second model is big five model (openness, conscientiousness, extraversion, agreeableness, and neuroticism).

11. A system for predicting a personality of at least one human subject, the system comprising:
one or more hardware processors; and
a computer-readable medium storing instructions that, when executed by the one or more hardware processors, cause the one or more hardware processors to perform operations comprising:
receiving data associated with the at least one human subject from one or more sources;
clustering the data based on one or more topics of interest of the at least one human subject using one or more topic modeling algorithms;
predicting at least one high level personality trait associated with the at least one human subject by analyzing the clustered data, the at least one high level personality trait being one of the one or more high level personality traits defined by a first model; and
predicting at least one personality profile by classifying the at least one high level personality trait into one or more granular level personality traits defined by a second model, the classifying being based on clustered data.

12. The system of claim 11, wherein a score is assigned to each of the one or more granular level personality traits based on emotion attached to the at least one topic of interest.

13. The system of claim 12, wherein the emotion attached to the at least one topic of interest is determined based on frequency of talking about the at least one topic of interest by the at least one human subject across the one or more sources.

14. The system of claim 12, wherein receiving the data associated with the at least one human subject from the one or more sources comprises:
retrieving the data from the one or more sources;
performing language identification on the data;
cleaning and filtering the data by removing unwanted characters and notation;
partitioning the data based on demography, culture, and gender; and
transforming the data to at least one format.

15. The system of claim 11, wherein a people search is performed based on at least one of a high level personality trait, the at least one personality profile, demographic distribution, gender, and the at least one topic of interest.

16. The system of claim 15, wherein a confidence level is determined for result associated with the people search, the confidence level indicative of accuracy of the result.

17. The system of claim 11, wherein a multi-dimensional hierarchical correlation matrix of one or more human subjects of the at least one human subject is generated based on at least one of the one or more topics of interest, gender, and demography.

18. The system of claim 11, wherein response of a user to the predicted at least one high level personality trait and the predicted at least one personality profile is monitored using self-learning techniques.

19. A non-transitory computer-readable medium storing instructions for predicting a personality of at least one human subject that, when executed by a processor, cause the processor to perform operations comprising:
receiving data associated with the at least one human subject from one or more sources;
clustering the data based on one or more topics of interest of the at least one human subject using one or more topic modeling algorithms;
predicting at least one high level personality trait associated with the at least one human subject by analyzing the clustered data, the at least one high level personality trait being one of the one or more high level personality traits defined by a first model; and
predicting at least one personality profile by classifying the at least one high level personality trait into one or more granular level personality traits defined by a second model, the classifying being based on clustered data.

20. The non-transitory computer-readable medium of claim 19, wherein a score is assigned to each of the one or more granular level personality traits based on emotion attached to the at least one topic of interest.

* * * * *

UNITED STATES PATENT AND TRADEMARK OFFICE
CERTIFICATE OF CORRECTION

| | | |
|---|---|---|
| PATENT NO. | : 9,449,287 B2 | |
| APPLICATION NO. | : 14/300860 | |
| DATED | : September 20, 2016 | |
| INVENTOR(S) | : Abhishek Gunjan | |

It is certified that error appears in the above-identified patent and that said Letters Patent is hereby corrected as shown below:

In claim 1, at col. 10, line 52, replace "first" with "high level" and add "trait" immediately after "personality".

In claim 1, at col. 10, line 53, cancel "second" and add "profile" immediately after "personality".

Signed and Sealed this
Sixth Day of December, 2016

Michelle K. Lee
*Director of the United States Patent and Trademark Office*